United States Patent
Smith et al.

(10) Patent No.: US 12,524,433 B2
(45) Date of Patent: Jan. 13, 2026

(54) MACHINE-LEARNED SCRIPT GENERATION FOR DATABASE MODIFICATIONS

(71) Applicant: ZenPayroll, Inc., San Francisco, CA (US)

(72) Inventors: Ian Smith, Denver, CO (US); Amanda Aizuss, Santa Monica, CA (US); Cody Sehl, Denver, CO (US); Luis Serazo, New York, NY (US); Nieves Morán Silva, Mexico City (MX); Ayush Saraswat, New York, NY (US); Zac Walberer, Flagstaff, AZ (US); Prity Kumari, San Francisco, CA (US); Andrew Collins Bessey, New York, NY (US)

(73) Assignee: ZenPayroll, Inc., San Francisco, CA (US)

( * ) Notice: Subject to any disclaimer, the term of this patent is extended or adjusted under 35 U.S.C. 154(b) by 0 days.

(21) Appl. No.: 18/599,911

(22) Filed: Mar. 8, 2024

(65) Prior Publication Data
US 2025/0284706 A1    Sep. 11, 2025

(51) Int. Cl.
| G06F 16/00 | (2019.01) |
| G06F 16/25 | (2019.01) |
| G06N 20/00 | (2019.01) |
| G06F 16/21 | (2019.01) |

(52) U.S. Cl.
CPC .......... G06F 16/258 (2019.01); G06N 20/00 (2019.01); G06F 16/214 (2019.01)

(58) Field of Classification Search
CPC ..... G06F 16/258; G06F 16/214; G06N 20/00; G06Q 10/105
USPC .................................................. 707/600–899
See application file for complete search history.

(56) References Cited

U.S. PATENT DOCUMENTS

| 2019/0197176 A1 | 6/2019 | Luo et al. |
| 2019/0312793 A1 | 10/2019 | Hazen et al. |
| 2020/0193327 A1 | 6/2020 | Iwakura et al. |
| 2020/0285694 A1* | 9/2020 | Nield .................. G06F 9/45504 |
| 2022/0114522 A1* | 4/2022 | Cardoso ................ G06F 40/174 |
| 2022/0374914 A1 | 11/2022 | Morrill et al. |
| 2023/0351176 A1* | 11/2023 | Darmour .................. G06N 3/08 |
| 2023/0368306 A1* | 11/2023 | Sarda ..................... G06Q 40/12 |
| 2024/0046178 A1 | 2/2024 | Henryson et al. |

(Continued)

OTHER PUBLICATIONS

PCT International Search Report and Written Opinion, PCT Application No. PCT/US2025/018820, Jun. 30, 2025, nine pages.

*Primary Examiner* — Michelle N Owyang
(74) *Attorney, Agent, or Firm* — Fenwick & West LLP

(57) ABSTRACT

A central database system accesses historical employee spreadsheets along with their modified versions, which have undergone data modification operations. The system creates a training dataset from those spreadsheets to train a machine-learned model. The model is configured to analyze a target employee spreadsheet, identify a historical spreadsheet similar to it, and generate executable scripts based on data modifications performed on the identified historical spreadsheet. The set of scripts is applied to the target spreadsheet to produce a target modified spreadsheet, mimicking historical modification. The modified spreadsheet is sent to an employee spreadsheet processing system for further processing.

20 Claims, 11 Drawing Sheets

(56) References Cited

U.S. PATENT DOCUMENTS

2024/0347156 A1* 10/2024 Paulett .................. G16H 10/60
2024/0419950 A1* 12/2024 Tong .................... G06N 3/0475

* cited by examiner

410

---

Here is a CSV of payroll data from the time-tracking software, XYZ:
```
Date,Client,Project,Project Code,Task, Notes, Hours,Billable?,Invoiced?, Approved?, First Name, Last Name,Roles, Employee?, Billable Rate, Billable Amount, Cost Rate, Cost Amount, Currency
2023-07-21,Bananas Inc., Website, Design, 4, Yes, No, No, Emma, Smith, Yes, 100, 400, 0, 0, US Dollar - USD 2023-07-21, Acme Corp, Website, Product Management, Design, 8, Yes, No, No, Liam, Johnson, Yes, 100, 0, 0, 0, US Dollar - USD 2023-07-21,Bananas Inc., Website, Design, 4, Yes, No, No, Liam, Johnson, Yes, 100, 400, 0, 0, US Dollar - USD
```
412

--- here is what I would like the CSV translated to be:
```
full_name, regular_hours, overtime_hours, double_overtime_hours, additional_earnings, time_off_hours, personal_notes, holiday_hours, reimbursements, deductions
Emma Smith,8,0,0,0,0,,0,0,0
Liam Johnson,12,0,0,0,0,,0,0,0
```
414

---

Can you write some Python code that could take any CSV input string from XYZ and turn it into my desired output?

```python
import pandas as pd def convert_harvest_csv(input_file_path):
    # Read the input CSV file
    df = pd.read_csv(input_file_path)

# Process the data
    # 1. Combine 'First Name' and 'Last Name' into 'full_name'
    df['full_name'] = df['First Name'] + ' ' + df['Last Name']

# 2. Group by 'full_name' and sum 'Hours'
    output_df = df.groupby('full_name')['Hours'].sum().reset_index()

# 3. Rename 'Hours' to 'regular_hours' and add other required columns
    output_df.rename(columns={'Hours': 'regular_hours'}, inplace=True)
    output_df['overtime_hours'] = 0
    output_df['double_overtime_hours'] = 0
    output_df['additional_earnings'] = 0
    output_df['time_off_hours'] = 0
    output_df['personal_notes'] = ''
    output_df['holiday_hours'] = 0
    output_df['reimbursements'] = 0
    output_df['deductions'] = 0 return output_df

Example usage:
# converted_df = convert_harvest_csv("path_to_your_input_file.csv")
# print(converted_df)
```

FIG. 4C

Original Employee Record
500A

| type | hours |
|------|-------|
| REG  | 8     |
| OT   | 1.25  |
| SICK | 32    |
| PTO  | 40    |

FIG. 5A

Modified Employee Record
500B

| regular_hours | overtime_hours | pto_hours |
|---------------|----------------|-----------|
| 8             | 1.25           | 72        |

FIG. 5B

Original Employee Record
600A

| name | mileage | expenses |
|---|---|---|
| Louise Smith | 31.14 | $14.25 |

FIG. 6A

Modified Employee Record
600B

| full_name | reimbursements |
|---|---|
| Louise Smith | $34.65 |

FIG. 6B

Original Employee Record
700A

| Employee | Clock In | Clock Out |
|---|---|---|
| (Lead Surveyor) Smith, Henry | 20230605083000 | 20230605153000 |
| (Lead Surveyor) Smith, Henry | 20230605180000 | 20230605220000 |

FIG. 7A

Modified Employee Record
700B

| First_name | Last_name | Job | Regular_hours | Over_time |
|---|---|---|---|---|
| Henry | Smith | Lead Surveyor | 7 | 4 |

FIG. 7B

MACHINE-LEARNED SCRIPT GENERATION FOR DATABASE MODIFICATIONS

BACKGROUND

This disclosure relates generally to database systems, and more specifically to training and applying machine-learned models to generate executable scripts for database modifications.

Entities need to maintain employee data for various purposes, including legal compliance, tax purposes, financial planning and budgeting, employee management, audit, and legal evidence, as well as benefits administration. Different entities often have distinct employee data formats due to a variety of reasons related to their size, operational needs, regulatory requirements, and the specific employee systems they employ. For example, jurisdictions vary in regulations regarding payroll, including the calculation, reporting, and taxation of wages. Furthermore, numerous employee software solutions and service providers offer different features, capabilities, and data formats. Entities may choose an employee database system that best fits their specific needs at a certain time, leading to variations in how employee data is formatted and managed.

This diversity in data representation poses significant challenges for entities looking to migrate employee data from one system to another or to consolidate data from multiple systems into a single, unified format. When a company switches employee database systems, database administrators are often tasked with manually examining both the source and target data formats, identifying corresponding elements between the formats, recognizing any format-specific peculiarities, and writing custom scripts to convert data from the first format to the second. This process is inherently labor-intensive and error-prone. Inaccuracies in the conversion process can lead to serious issues, such as incorrect payroll calculations, compliance violations, and employee dissatisfaction.

SUMMARY

Embodiments described herein relate to methods or systems that solve the above-described problem by employing machine-learned models to automatically generate executable scripts configured to transform payroll data from a first format to a second format.

In some embodiments, a system accesses a set of historical employee spreadsheets, each associated with employee activity and characteristics for a period of time. For each historical employee spreadsheet, the system identifies an associated historical modified spreadsheet generated in response to one or more data modification operations applied to the historical employee spreadsheet. The system generates a training set of data comprising the historical employee spreadsheets and the associated historical modified spreadsheets and trains a machine-learned model using the training set of data.

The machine-learned model is configured to receive an employee spreadsheet and identify a set of historical employee spreadsheets most similar (or sufficiently similar) to the received employee spreadsheet. The machine-learned model is also configured to identify one or more data modification operations used to generate the historical modified spreadsheets associated with the identified set of historical employee spreadsheets. The machine-learned model is then used to generate a set of executable scripts based on the identified one or more data modification operations. When the set of executable scripts is executed on the received employee spreadsheet, the one or more data modification operations are applied to the received employee spreadsheet to produce a set of modified employee spreadsheets.

In some embodiments, the one or more data modification operations include identifying related data entries and aggregating the identified related data entries into a single entry. In some embodiments, the one or more data modification operations include separating a data in a single column of the spreadsheet into a plurality of columns. In some embodiments, the one or more data modification operations include identifying data entries associated with a plurality of types of expenses and adding the data entries associated with the plurality of types of expenses into a single entry associated with a single type of reimbursement. In some embodiments, the one or more data modification operations include identifying time-tracking data entries associated with a plurality of task types and associated cost rates and aggregating a set of time-tracking data entries based in part on an identified task type or an associated cost rate.

When a target employee spreadsheet is received, the system modifies the target employee spreadsheet by applying the machine-learned model. The machine-learned model generates a target set of executable scripts and applies the target set of executable scripts to the target employee spreadsheet to produce a target modified spreadsheet. The target modified spreadsheet is then transmitted to an employee spreadsheet processing system for further processing.

In some embodiments, the system is also configured to receive feedback that the target modified spreadsheet does not satisfy one or more requirements of the employee spreadsheet processing system. In such embodiments, the machine-learned model is used to generate a new set of executable scripts based on the feedback. In some embodiments, the machine-learned model is retrained based on the feedback, and the retrained machine-learned model is used to generate the new target set of executable scripts.

In some embodiments, the machine learned model is a large language model (LLM). The system is configured to generate a prompt, including a first set of one or more records from the target employee spreadsheet in a first format, a second set of one or more modified records corresponding to the first set of one or more records in a second format, and a request for generating a set of executable script for converting the first set of one or more records to the second set of one or more modified records. The prompt is then sent to the LLM, causing the LLM to generate the set of executable scripts. The system receives the set of executable scripts from the LLM and executes the set of executable scripts on remaining records in the target employee spreadsheet to convert the remaining records in the target employee spreadsheet to the second format. In some embodiments, the system detects a new data entry in the target employee spreadsheet, applies the set of executable scripts to the new data entry to produce a target data entry to generate a modified new data entry, and transmits the modified new data entry to the employee spreadsheet processing system.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIG. 4B illustrates an example prompt to be entered into an LLM, in accordance with one or more embodiments.

FIG. 4C illustrates an example set of executable scripts output by a machine-learned model (e.g., an LLM), in accordance with one or more embodiments.

FIGS. 5A-5B illustrate example data operations that may be applied to an employee spreadsheet in accordance with one or more embodiments.

FIGS. 6A-6B illustrate additional example data operations that may be applied to an employee spreadsheet in accordance with one or more embodiments.

FIGS. 7A-7B illustrate additional example data operations that may be applied to an employee spreadsheet in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
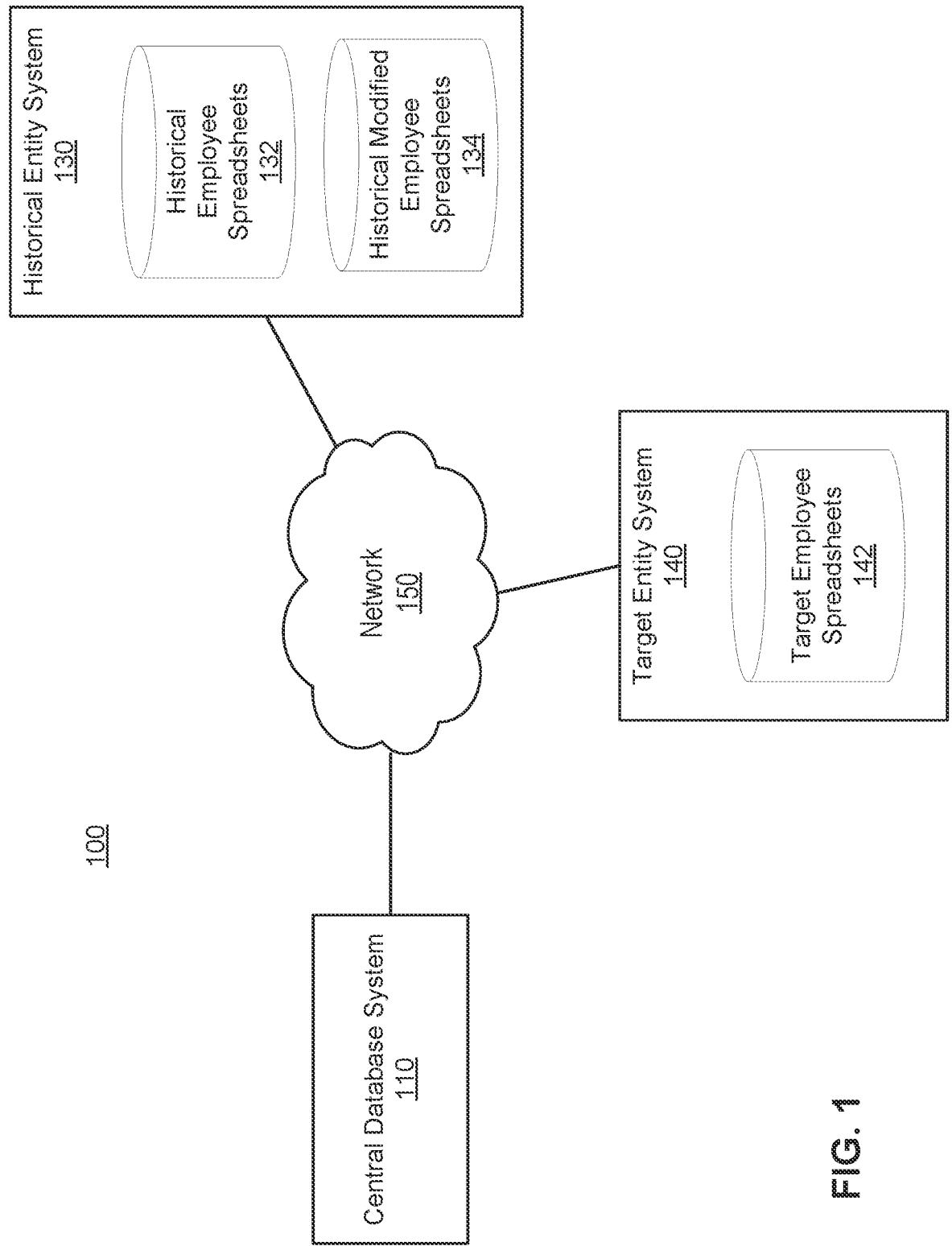
FIG. 1 is a block diagram of a system environment in which a central database system operates, according to one embodiment.

FIG. 1 is a block diagram of a system environment 100 in which a central database system operates, in accordance with an embodiment. The system environment 100 shown in FIG. 1 includes a central database system 110, one or more historical entity systems 130, one or more target entity systems 140, and a network 150. The system environment 100 may have alternative configurations than shown in FIG. 1, including, for example, different, fewer, or additional components.

The central database system 110 is, in some embodiments, a human resources management system configured to receive and store information associated with one or more entities ("the entities"). The entities may have their associated systems. For example, one or more historical entities may be associated with historical entity systems 130, and one or more target entities may be associated with one or more target entity systems 140. Each entity may be an institution (e.g., a corporation, a partnership, law firm, an educational institution, an organization, etc.) that employs and/or associates with one or more individuals. The central database system 110 stores information describing these individuals as well as relationships between the individuals and each of the entities. For example, the central database system 110 may include information about an individual's hiring date, employment level, position, title, geographic information, salary, benefits, tax status, contact information, and so on. The central database system 110 also stores characteristics describing both the historical entities and the target entities. Characteristics include, for example, information relating to an entity's size, type, industry, tax status, domicile, incorporation and/or formation, management personnel, and customer base, as well as actions performed by the entities or by individuals associated with the entities, resources used by the entities or individuals associated with the entities, and issues encountered by the entities or individuals associated with the entities. In some embodiments, the central database system 110 obtains such information from the historical entity systems 130 and/or the target entity systems 140.

Each historical entity system 130 manages employee data of a particular historical entity. Such employee data includes one or more historical employee spreadsheets 132 and one or more historical modified employee spreadsheets 134. The original historical employee spreadsheet 132 is in a first format, and the historical modified employee spreadsheet 134 is in a second format, different from the first format. The format change may be due to various reasons, such as changes in payroll systems or an acquisition of another entity, etc. The first format might not be able to fully integrate with the central database system 110, potentially restricting the utilization of more sophisticated data processing capabilities available within the central database system 110. Therefore, the historical employee spreadsheet 132 is converted to the historical modified employee spreadsheet 134 to ensure compatibility with the central database system 110 for enhanced processing capabilities.

Each target entity system 140 manages the employee data of a particular target entity. Such employee data includes one or more target employee spreadsheets 142. The one or more target employee spreadsheets 142 are in a format that may or may not be able to integrate with the central database system 110 fully. Thus, the one or more target employee spreadsheets 142 may need to be converted into the second format.

In some embodiments, the central database system 110 may train and apply machine-learned models using these historical employee spreadsheets 132, historical modified employee spreadsheets 134, and executable scripts used to convert the historical employee spreadsheets 132 into historical modified employee spreadsheets 134. The machine-learning models are trained to receive a target employee spreadsheet 142 and generate a set of executable scripts that, when applied to the target employee spreadsheet 142, modify the target spreadsheet to generate a modified target spreadsheet that is in the second format that is fully compatible with the central database system 110.

In some embodiments, the machine-learned model is a large language model (LLM). The central database system 110 is configured to retrain or fine-tune the LLM based on the historical employee spreadsheets 132, historical modified employee spreadsheets 134, and/or executable scripts used to convert the historical employee spreadsheets 132 into historical modified employee spreadsheets 134.

The central database system 110 may be a server, server group or cluster (including remote servers), or other suitable computing device or system of devices. The central database system 110 may communicate with other devices, including those associated with the historical entity systems 130 and the target entity systems 140, via client devices over the network 150 to receive and send information about individuals and entities. Examples of client devices include conventional computer systems (such as a desktop or a laptop computer, a server, a cloud computing device, and the like), mobile computing devices (such as smartphones, tablet computers, mobile devices, and the like), or any other device having computer functionality. The devices associated with the historical entity systems 130, the target entity systems 140, and the central database system 110 are configured to communicate via the network 120, for example using a native application executed by the devices or through an application programming interface (API) running on a native operating system of the devices, such as IOS® or ANDROID™. In another example, the devices associated with the historical entity systems 130, the target entity systems 140, and the central database system 110 communicate via an API running on the central database system 110.

The central database system 110, the historical entity systems 130, and the target entity systems 140 are configured to communicate via the network 150, which may comprise any combination of local area and/or wide area networks, using wired and/or wireless communication systems. In one embodiment, the network 150 uses standard communications technologies and/or protocols. For example, the network 150 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

Figure 2:
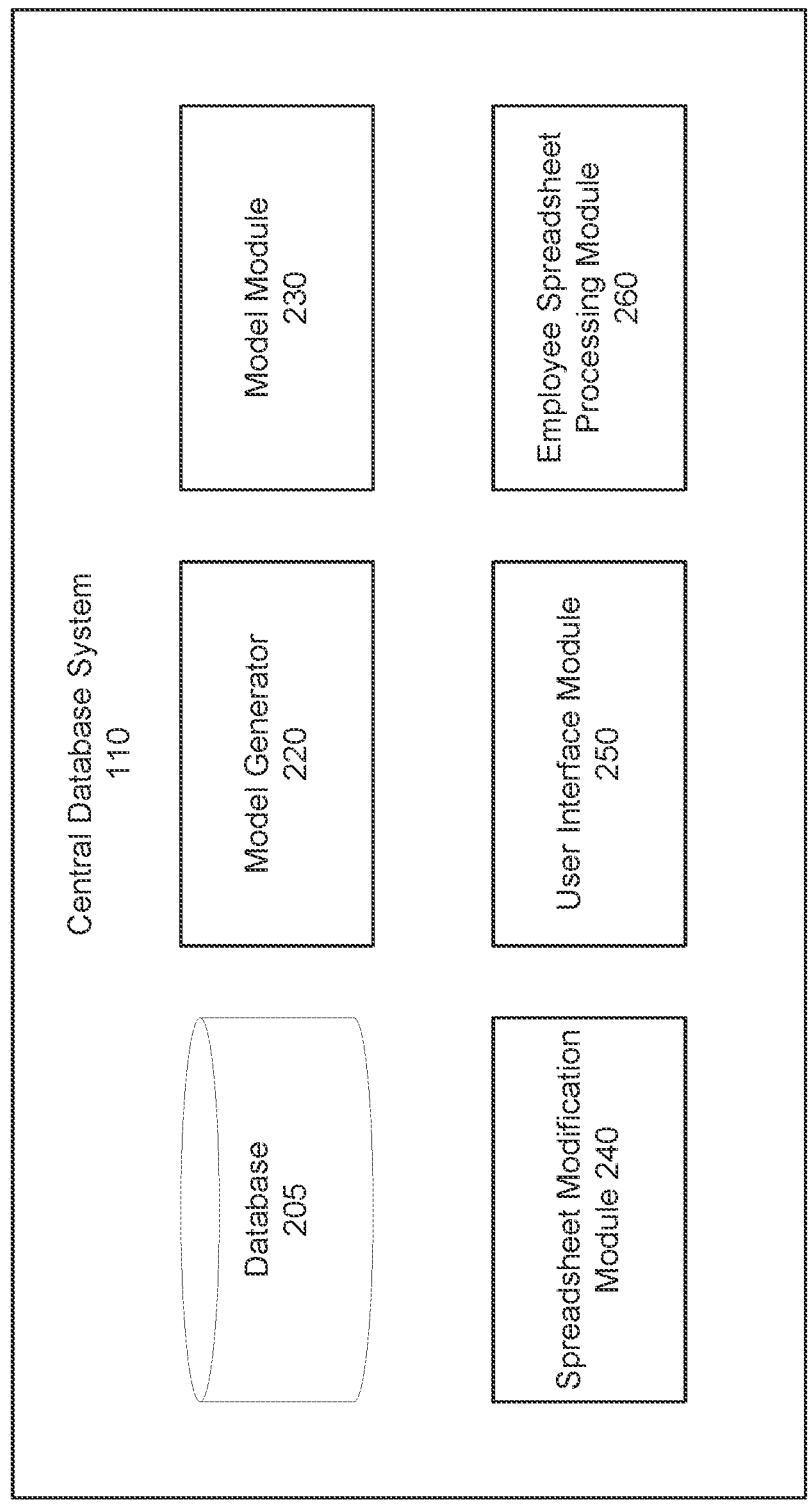
FIG. 2 is a block diagram illustrating a system architecture of the central database system, according to one embodiment.

FIG. 2 is a block diagram illustrating a system architecture of the central database system 110, according to one embodiment. The central database system 110 of FIG. 2 includes a database 205, a model generator 220, a model module 230, a spreadsheet modification module 240, a user interface module 250, and an employee spreadsheet processing module 260. It should be noted that in other embodiments, the central database system 110 can include fewer, additional, or different components than those illustrated herein. In addition, in the embodiment of FIG. 1, the central database system 110 is different from the historical entity systems 130 and the target entity systems 140. In such an embodiment, the central database system 110 includes hardware (such as servers, networking equipment, databases or other storage devices, data center systems, and the like) distinct (and in some embodiments, physically remotely from) the devices associated with the historical entity systems 130 and the target entity systems 140. Alternatively, in some embodiments, the central database system 110 may include or be local to all or part of the historical entity systems 130 and/or the target entity systems 140.

Database 205 is configured to store information associated with historical entity systems 130 and target entity systems 140. In some embodiments, the information stored in the database 205 includes information gathered from the historical entity systems 130 and/or the target entity systems 140 as they register with the central database system 110. For instance, the central database system 110 may be an enterprise software provider that provides human resources software to employers (e.g., entities, including the historical entity systems 130 and the target entity systems 140) for use with employees (e.g., individuals associated with the entities). Each employer may provide information describing the characteristics of the employer and characteristics of each of the employees to the central database system 110. The database 205 stores this information about each of the entities.

In some embodiments, the database 205 stores copies of historical employee spreadsheets 132, historically modified employee spreadsheets 134, and/or target employee spreadsheets 142. The employee spreadsheets 132, 134, and 142 may store a wide range of data related to employees and organizational structure for supporting various human resource functions, including recruitment, payroll, performance evaluations, and compliance with labor laws etc. Such data may include (but are not limited to) employee personal information, such as names, addresses, phone numbers, email addresses, emergency contacts, and possibly of photographs of employees; employment details, such as job titles, department information, supervisor details, employment status (e.g., full-time, part-time, contract), hire dates, and employment history with the entity; compensation and payroll information, such as salary or hourly wage, banking details for direct deposit, tax withholdings, benefits selections (such as health insurance, retirement plans, and other perks), and payroll history; performance management, such as performance reviews, feedback, goals, skills, assessments, and promotions; compliance and legal documentation, such as records related to compliance with labor laws, such as employment eligibility verification forms, work permits for non-citizens, background checks, and documentation of compliance with equal employment opportunity laws, etc.

Such information may be stored in different formats. For example, the historical employee spreadsheet 132 may be in various first formats that are not aligned with some processing functions provided by the employee spreadsheet processing module 260, and the historical modified employee spreadsheet 134 may be in a second format that is aligned with all the processing functions provided by the employee spreadsheet processing module 260. As such, the historical employee spreadsheets 132 have been modified to the historical modified employee spreadsheets 134. Such modification may be performed via applying a set of executable scripts on the historical employee spreadsheets 132. The executable scripts are configured to perform various data operations on the historical employee spreadsheets 132 to convert the historical employee spreadsheets 132 to the historical modified employee spreadsheets 134.

In some embodiments, the database 205 also stores a plurality of sets of executable scripts. The executable scripts may be in any scripting language, such as (but not limited to) Python, JavaScript, Perl, Ruby, R, VBA, Lua, Groovy, Powershell, or PHP. When each set of these scripts is executed, it causes a historical employee spreadsheet 132 to be converted to a corresponding modified employee spreadsheet 134. These scripts may be generated manually by programmers or generated automatically by machine-learned models.

The model generator 220 trains machine-learned models. In some embodiments, the model generator 220 uses data stored in the database 205 or obtained from the historical entity systems 130 and the target entity systems 140, to train a machine-learned model. The machine-learned model is trained to receive an employee spreadsheet, identify a set of historical employee spreadsheets most similar to the target employee spreadsheet, and identify one or more data operations that are applied to the set of historical employee spreadsheets to convert the set of historical employee spreadsheets to a corresponding set of historical modified employee spreadsheets. The machine-learned model then generates a set of executable scripts that, when applied to the received employee spreadsheet, modify the received spreadsheet using the identified one or more data modification operations.

In some embodiments, the machine-learned model is a large language model (LLM). In some embodiments, the LLM is trained based on the historical employee spreadsheets, the historical modified employee spreadsheets, and a plurality of sets of executable scripts that are used to convert the historical employee spreadsheets to the historical modified employee spreadsheets. In some embodiments, the LLM is a pretrained model, and the model generator 220 retrains or fine-tunes the LLM using the historical employee spreadsheets, the historical modified employee spreadsheets, and a plurality of sets of executable scripts that are used to convert the historical employee spreadsheets to the historical modified employee spreadsheets.

Alternatively, the LLM is a pretrained model that is configured to take natural language prompts to generate executable scripts. In some embodiments, the LLM is capable of context learning. Context learning refers to a process where an LLM is trained to understand and utilize the context in which a prompt is presented. For example, the LLM is able to learn from examples included in a prompt.

In some embodiments, the retraining or fine-tuning only uses a subset of the records in the spreadsheets 132, 134. For example, the few examples may include a few records in a historical employee spreadsheet and a few corresponding records in a historical modified employee spreadsheet. As another example, the few examples may include a few records in a target employee spreadsheet and a few corresponding modified records in the target employee spreadsheet. Additional details about the training and application of the machine-learned models are described below, for instance with respect to FIGS. 3-8.

In some embodiments, the model module 230 stores the machine-learned models generated by the model generator 220. In some embodiments, the model module 230 may store various versions of models as they are updated over time. In other embodiments, the model module 230 may store multiple versions of a type of model. The models can be accessed from the model module 230 by the central database system 110 or the modules of the central database system as needed. In some embodiments, the model module 230 may be remote from the central database system 110. In some embodiments, the model module 230 may be an orchestrator configured to access different model services. For example, an LLM may be stored remotely and accessible by the central database system 110 via network 150.

The spreadsheet modification module 240 accesses one or more of the models stored within or accessible by the model module 230 and applies the models to a target employee spreadsheet 142. In some embodiments, a first model is configured to compare the target employee spreadsheet 142 with historical employee spreadsheets 132 to identify a set of historical employee spreadsheets most similar to the target employee spreadsheet 142, and identify one or more data operations used to convert the set of historical employee spreadsheets to the set of historical modified employee spreadsheets. A second model is configured to generate a set of executable scripts based on the identified one or more data operations. When the set of executable scripts is executed on the target employee spreadsheet 142, the target employee spreadsheet 142 in the first format is converted into a target modified employee spreadsheet in a second format. The conversion includes applying one or more data operations on the target employee spreadsheet 142. The target modified spreadsheet is then transmitted to the employee spreadsheet processing system for further processing.

The user interface module 250 is configured to generate user interfaces for users (e.g., individuals associated with the central database system 110, historical entity systems 130, and target entity systems 140) to interact with the central database system 110. The user interface module 250 may receive input from users, indicating importing a target employee spreadsheet 142 into the central database system 110. In some embodiments, the importing of the target employee spreadsheet 142 may cause a copy of the target employee spreadsheet to be generated in database 205. Alternatively, the importing of the target employee spreadsheet may grant the central database system 110 access to the target employee spreadsheet 142 via network 150.

In some embodiments, responsive to receiving the target employee spreadsheet, the employee spreadsheet processing module 260 analyzes the received target employee spreadsheet 142 to determine whether the received target employee spreadsheet 142 satisfies one or more predetermined requirements. Responsive to determining that the target employee spreadsheet does not satisfy the one or more predetermined requirements, the target employee spreadsheet 142 is sent to spreadsheet modification module 240 for modification.

In some embodiments, after the spreadsheet modification module 240 modifies or converts the target employee spreadsheet 142 to the target modified employee spreadsheet, the user interface module 250 causes one or more records or at least a portion of the target modified employee spreadsheet to be presented to a user. In some embodiments, the user may provide input via the user interface to approve or reject the target modified employee spreadsheet. In some embodiments, the user may provide input via the user interface to approve or reject a particular data operation applied to the target employee spreadsheet. In some embodiments, the user may provide input via the user interface to indicate that certain columns of the target modified spreadsheet need to undergo one or more additional data operations.

In some embodiments, after the employee spreadsheet processing module 260 receives the target modified employee spreadsheet, it again determines whether the one or more predetermined conditions are satisfied. Responsive to determining that one or more predetermined conditions are not satisfied, the employee spreadsheet processing module 260 generates feedback to cause the spreadsheet modification module 240 to further modify the target modified employee spreadsheet. Alternatively, or in addition, the employee spreadsheet processing module 260 may generate a notification, notifying the user about the unsatisfied requirements. The user can intervene or have the spreadsheet modification module 240 perform additional modifications.

In some embodiments, spreadsheet modification module 240 may be configured to generate an updated prompt for the LLM based on the user feedback or feedback from the spreadsheet processing module 260, and cause the LLM to consider the feedback and generate a new set of executable scripts based on the feedback.

Training and Applying Machine-Learned Model(s)

Figure 3:
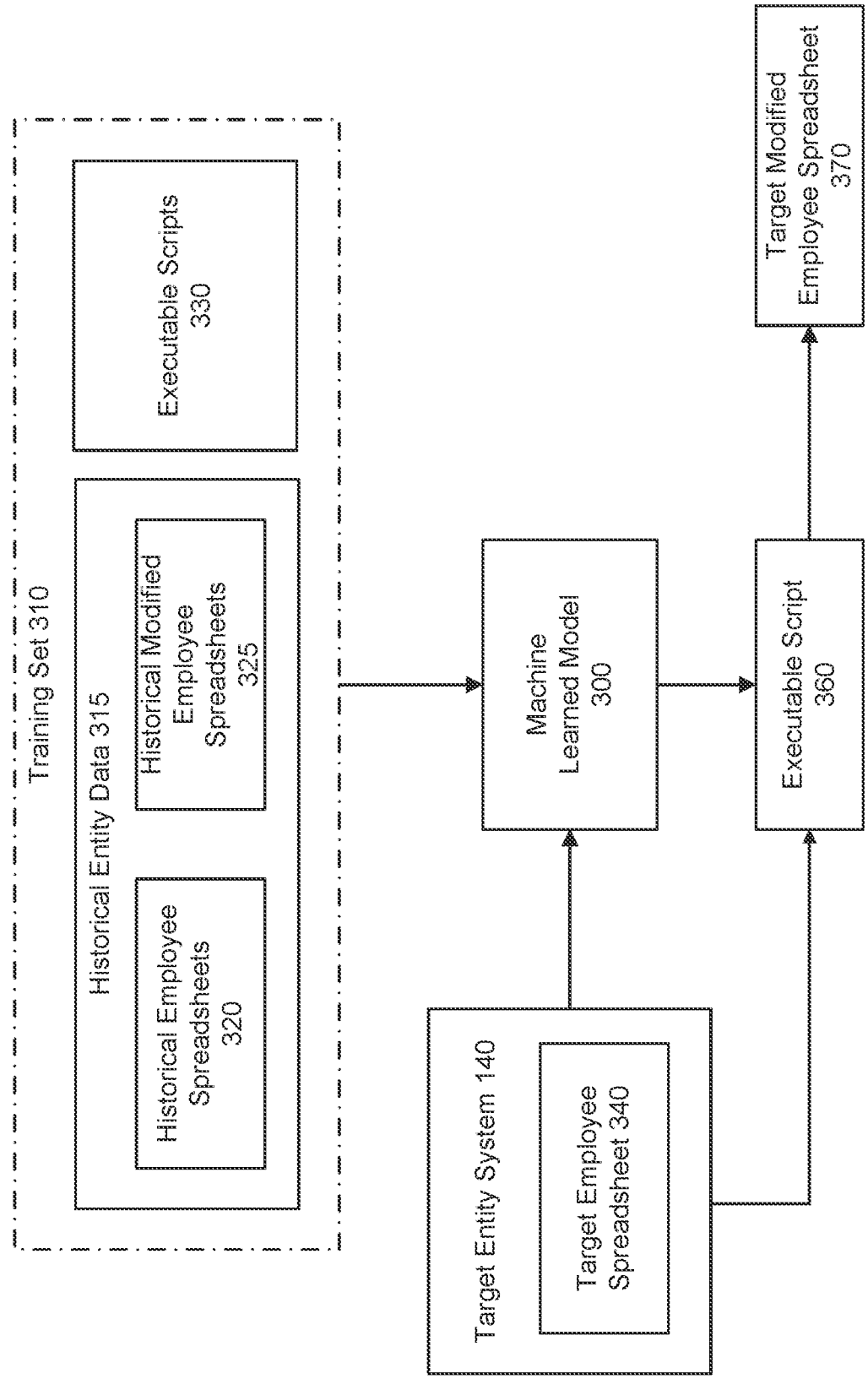
FIG. 3 illustrates training and applying a machine-learned model configured to identify future issues that a target entity is likely to face, according to one embodiment.

FIG. 3 illustrates training and applying a machine-learned model 300 configured to generate a set of scripts for modifying a target employee spreadsheet, according to one embodiment. As described above, the machine-learned model 300 is trained on historical entity data, including historical employee spreadsheets 320 and historical modified employee spreadsheets 325. In some embodiments, the training set 310 may also include a plurality of sets of executable scripts 330 configured to perform various data operations. These data operations are performed when a historical employee spreadsheet 320 is converted into a historical modified employee spreadsheet 325.

The model generator 220 may use one or more different types of supervised or unsupervised machine learning, or any other suitable training technique to generate and update the machine learned model 300. In some embodiments, the model generator 220 uses one or more of linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on for training the machine-learned model 300.

The machine-learned model 300 is trained to receive an employee spreadsheet, identify a set of historical employee spreadsheets most similar to the received employee spreadsheet. In some embodiments, the machine-learned model 300 is trained to compare the received employee spreadsheet with historical employee spreadsheets to determine similarity scores, and select a set of historical employee spreadsheets that have similarity scores greater than a predetermined threshold. In some embodiments, the machine-learned model 300 traverses the historical employee spreadsheets to identify at least one historical employee spreadsheet that has a similarity score greater than the threshold, and select the at least one historical employee spreadsheet as similar to the received employee spreadsheet. If none of the historical employee spreadsheet has a similarity score greater than the threshold, the historical employee spreadsheets with the highest scores are selected.

In some embodiments, the machine-learned model 300 is trained to classify the historical employee spreadsheets into a plurality of categories and determine whether the received employee spreadsheet belongs to one of the plurality of categories. A set of historical employee spreadsheets that belong to the same category would be deemed as the most similar to the received employee spreadsheet. Once a similar set of historical employee spreadsheets is identified, the machine-learned model identifies one or more data modification operations used to generate the associated historically modified spreadsheets and generates a set of scripts to perform the one or more data modification operations.

In some embodiments, the one or more data modification operations include identifying related data entries and aggregating the identified related data entries into a single entry. In some embodiments, the one or more data modification operations include identifying data entries associated with a plurality of types of expenses and adding the data entries associated with the plurality of types of expenses into a single entry associated with a single type of reimbursement. In some embodiments, the one or more data modification operations include identifying time-tracking data entries associated with a plurality of task types and associated cost rates and aggregating a set of time-tracking data entries based in part on an identified task type or an associated cost rate.

A target employee spreadsheet 340 may be received from a target entity system 140. The target entity system 140 may be associated with an entity that previously used a different HR management system, such that their employee spreadsheets are in a format that is not completely aligned with the employee spreadsheet processing module 260.

Responsive to receiving a target employee spreadsheet 340 from a target entity system 140, the machine-learned model 300 compares the target employee spreadsheet 340 with historical employee spreadsheets 320 to identify a set of most similar (or sufficiently similar) historical employee spreadsheets and identify one or more data operations applied to the set of similar historical employee spreadsheets. The machine-learned model 300 generates a set of executable scripts based on the identified one or more data operations and causes the set of executable scripts to be applied to the target employee spreadsheet 340 to convert the target employee spreadsheet 340 into a target modified employee spreadsheet 370.

In some embodiments, the machine-learned model 300 may include one or more machine-learned models, each of which is trained to perform a different task. In some embodiments, one or more machine-learned models 300 include a similarity model configured to compare the target employee spreadsheet 340 with the historical employee spreadsheets 320 to identify a set of most similar (or sufficiently similar) historical employee spreadsheets. In some embodiments, the one or more machine-learned models 300 also include a language model configured to generate a set of executable scripts based on the identified one or more data operations.

In some embodiments, the one or more machine-learned models 300 includes a large language model (LLM). In some embodiments, the training set 310 is used to train the LLM. Alternatively, or in addition, the training set 310 is used to retrain or fine-tune a pretrained LLM. Alternatively, or in addition, the training set 310 is used to cause a pretrained LLM to perform context learning. The spreadsheet modification module 240 is configured to generate and send a prompt to the LLM, causing the LLM to learn context from the prompt and generate a set of scripts based on the learned context.

Figure 4A:
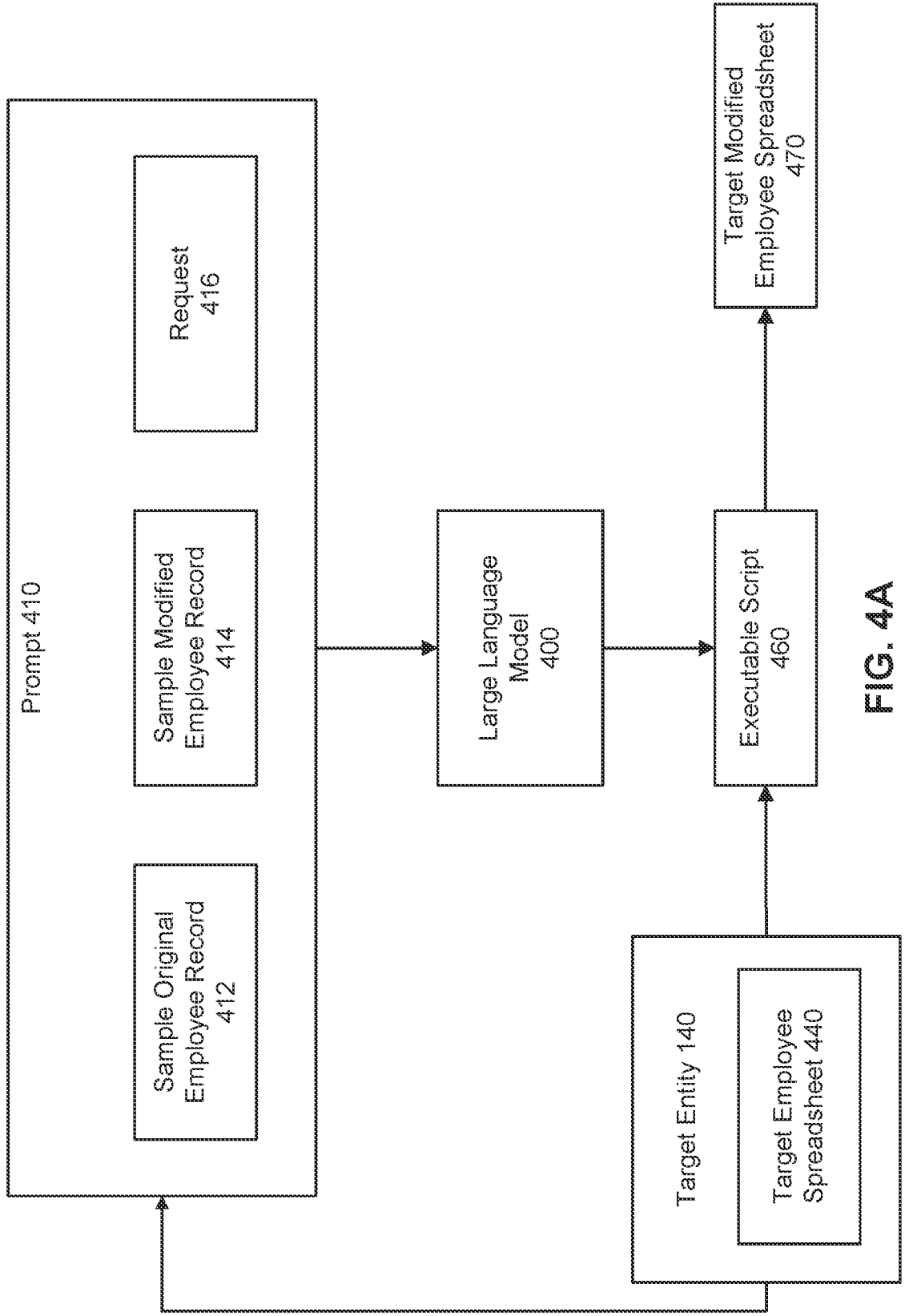
FIG. 4A illustrates an example process of using an LLM to generate a set of scripts for modifying a target employee spreadsheet in accordance with one or more embodiments.

FIG. 4A illustrates an example process of using an LLM 400 to generate a set of scripts for modifying a target employee spreadsheet in accordance with one or more embodiments. In some embodiments, the prompt 410 includes one or more sample original employee records 412, one or more sample modified employee records 414, and a request 416 for generating a set of scripts converting the sample original employee records 412 into the sample modified employee records 414. In some embodiments, the sample original employee records 412 and the sample modified employee records 414 are generated based on the identified similar set of historical employee spreadsheets and corresponding historical modified employee spreadsheets. Alternatively, the sample original employee record 412 and the sample modified employee record 414 are generated based on one or more employee records in a target employee spreadsheet 440.

Responsive to receiving the prompt, the LLM 400 is configured to generate a set of executable scripts 460. The set of executable scripts 460 is executed on all or remaining employee records in the target employee spreadsheet 440 to cause those employee records in the target employee spreadsheet 440 to be modified similarly to those sample employee records, resulting in the target modified employee spreadsheet 470.

FIG. 4B illustrates an example prompt 410 to be entered into an LLM, in accordance with one or more embodiments. As illustrated, the prompt 410 includes three sections. The first section includes a CSV of payroll data 412 from a time-tracking software, XYZ. This section may include a complete original employee spreadsheet, a subset of the original employee spreadsheet, or a few records in the original employee spreadsheet. The original employee spreadsheet may be an identified similar historical employee spreadsheet or the target employee spreadsheet. As illustrated, the original employee spreadsheet is in CSV format, although CSV is not the only format that may be processed by the LLM. For example, the original employee spreadsheet may also be in JSON, Excel, XML, or any other text-based database file type. In some embodiments, the LLM is trained to detect the file type. Alternatively, the file format is provided in the prompt as shown in the example of FIG. 4B.

The second section includes a CSV of modified data records 414, which may include one or a few modified data records, or a complete modified employee spreadsheet. The modified employee spreadsheet may be a historical modified employee spreadsheet corresponding to the historical employee spreadsheet entered in the first section 412 of the prompt 410.

The third section is request 416, which requests the LLM to write some Python code that could take any CSV input string from section 412 of the prompt and turn it into the desired output in section 414. Python code is merely an example scripting language that may be generated by the LLM. In some embodiments, the LLM may also trained to generate scripts in other scripting languages, such as (but not limited to) JavaScript, Perl, Ruby, R, VBA, Lua, Groovy, Powershell, or PHP. In some embodiments, the LLM may be trained to output scripts in a default language, such as Python if the prompt does not specify the scripting language. When the prompt specifies the scripting language, the LLM generates a set of executable scripts in the specified scripting language.

FIG. 4C illustrates an example set of executable scripts 460 output by the LLM, in accordance with one or more embodiments. The output set of scripts 460 is in Python language. The set of scripts 460 can then be applied to a target employee spreadsheet (which is in a format similar to the CSV in section 412 of the prompt 410 in FIG. 4A) to cause the target employee spreadsheet to be converted into the desired format, similar to the CVS shown in section 414 of the prompt 410 in FIG. 4B.

The resulting target modified employee spreadsheet includes one or more data operations applied on the original employee spreadsheet. As illustrated, a first portion of the set of scripts 460 combines "first name" and "last name" columns in the original target employee spreadsheet into a single column "full_name." A second portion of the set of scripts 460 groups the "hours" column by "full_name" and sums all the hours corresponding to the same "full_name" into a single entry. A third portion of the set of scripts 460 renames column "hours" to "regular_hours", and adds new columns, "overtime_hours", "double_overtime_hours", "additional_earnings", "time_off_hours", "personal_notes", "holiday_hours", "reimbursements", and "deductions," initialized with a default value 0.

Example Data Operations That May be Performed on Employee Data

FIGS. 5A and 5B illustrate an example data operation in accordance with one or more embodiments. FIG. 5A illustrates a portion of an original employee record 500A, including four types of hours, namely, regular hours (REG), overtime hours (OT), sick leave hours (SICK), and paid time off (PTO). FIG. 5B illustrates a portion of a modified employee record 500B, that aggregated SICK hours (32) and PTO (40) in FIG. 5A into a single pto_hours (72), the OT and REG hours remain the same.

FIGS. 6A and 6B illustrate another example data operation in accordance with one or more embodiments. FIG. 6A illustrates a portion of an employee record 600A showing two types of expenses, namely mileage and expenses. The mileage is in the unit of miles, and the expenses is in the unit of dollars. FIG. 6B illustrates a portion of a modified employee record 600B that converted the mileage into a dollar amount and aggregated the dollar amount associated with mileage and expenses dollar amount into a single item, reimbursements ($34.65). This data operation includes multiplying a dollar amount for each mile to convert the mileage into a total dollar amount for the mileage, and adding the total dollar amount for the mileage with expenses dollar amount $14.25 to generate the reimbursements amount $34.65.

FIGS. 7A and 7B illustrate another example data operation in accordance with one or more embodiments. FIG. 7A illustrates a portion of an employee record 700A showing an employee's clock in and clock out times for each day. FIG. 7B illustrates a portion of a modified employee record 700B that converted the clock in and clock out time into a number of regular hours worked (7) and a number of over time hours worked (4). The data operations applied here include separating the data in each employee column into three different columns, namely First_name (e.g., Smith), Last_name, and Job. The data operations also include deducting each clock in time from the corresponding clock out time to generate hours worked in each record, and sum all the hours worked during regular hours into a regular_hours column entry, and sum all the hours worked during overtime hours into an over_time column entry.

For example, in the first entry, clock out time is 20230605153000, and the clock-in time is 20230605083000; this indicates that the lead surveyor Henry Smith worked from 8:30 to 15:30 on Jun. 5, 2023, which is seven regular hours. In the second entry, clock out time is 20230605220000, and the clock in time is 20230605180000; this indicates that the lead surveyor Henry Smith worked from 18:00 to 22:00 on Jun. 5, 2023, which is four overtime hours. The seven regular hours and the four overtime hours are entered in their corresponding columns in the new spreadsheet 700B.

FIGS. 5A-7B merely illustrate a few examples of records that may be automatically modified by a set of executable scripts generated by machine-learned models 300. There are many additional data operations that may be performed on columns or rows of employee spreadsheets to cause an original employee spreadsheet to be modified into a modified employee spreadsheet.

Figure 8:
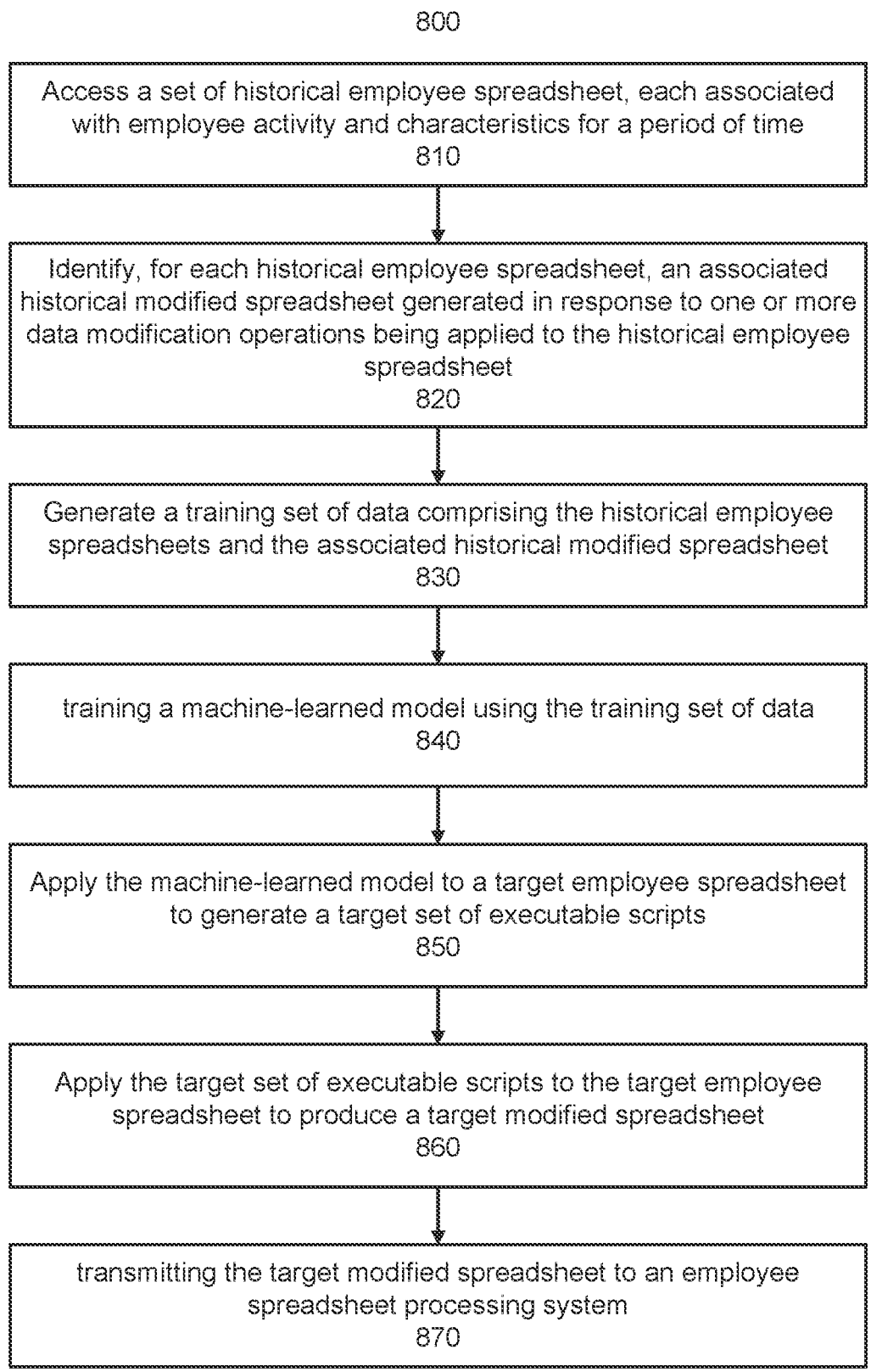
FIG. 8 illustrates an example method 800 for using machine learning to generate scripts for modifying employee spreadsheets in accordance with one or more embodiments.

Example Method for Using Machine-Learned Model to Generate Scripts For Employee Data Modifications FIG. 8 illustrates an example method 800 for using machine-learning to generate scripts for modifying employee spreadsheets, in accordance with one or more embodiments. The method 800 may be performed by a central database system (e.g., central database system 110), or any computer system that has access to historical employee spreadsheets, historical modified employee spreadsheets, and/or target employee spreadsheets. It should be noted that in other embodiments, the process of FIG. 8 can include fewer, additional, or different steps than those described herein. The method 800 may be performed by a central database system (e.g., the central database system 110). Alternatively, the method 800 may be performed by any computing system that has access to historical entity data and target entity data.

A central database system (e.g., the central database system 110) accesses 810 a set of historical employee spreadsheets, each associated with employee activity and characteristics for a period of time. The central database system identifies 820, for each historical employee spreadsheet, an associated historical modified spreadsheet generated in response to one or more data modification operations being applied to the historical employee spreadsheet.

In some embodiments, the one or more data modification operations include identifying related data entries and aggregating the identified related data entries into a single entry. In some embodiments, the one or more data modification operations include separating a data in a single column of the spreadsheet into a plurality of columns. In some embodiments, the one or more data modification operations include identifying data entries associated with a plurality of types of expenses and adding the data entries associated with the plurality of types of expenses into a single entry associated with a single type of reimbursement. In some embodiments, the one or more data modification operations include identifying time-tracking data entries associated with a plurality of task types and associated cost rates and aggregating a set of time-tracking data entries based in part on an identified task type or an associated cost rate. FIGS. 5A, 5B, 6A, 6B, 7A and 7B illustrate a few example data modification operations that may be applied to original employee spreadsheets.

The central database system generates 830 a training set of data comprising the historical employee spreadsheets and the associated historical modified spreadsheets. In some embodiments, the training set of data may also include a set of executable scripts that are used to perform one or more data operations that convert the historical employee spreadsheets into the associated historical modified spreadsheets.

The central database system trains 840 a machine-learned model using the training set of data. In some embodiments, the machine-learned model includes a similarity model. For a received employee spreadsheet, the machine-learned mode is configured to identify a set of most similar historical employee spreadsheets. In some embodiments, the machine-learned model is configured to compare the received employee spreadsheet with historical employee spreadsheets to generate similarity scores indicating a similarity between the received employee spreadsheet and the historical employee spreadsheet, and select a set of historical employee spreadsheets that have the highest similarity scores. In some embodiments, the machine-learned model is configured to compare the received employee spreadsheet with each of the historical employee spreadsheets. Alternatively, the machine-learned model is configured to compare a subset of the historical employee spreadsheets, until a historical employee spreadsheet with a similarity score greater than a threshold is identified, and that historical employee spreadsheet is selected.

In some embodiments, the machine-learned model is configured to classify the historical employee spreadsheets into a plurality of categories, and determine whether the received employee spreadsheet belongs to one of the plurality of categories. Responsive to determining that the received employee spreadsheet belongs to one of the plurality of categories, one or more historical employee spreadsheets in the category are selected as similar ones.

The machine-learned model is also configured to identify one or more data operations performed on the set of similar historical employee spreadsheets to convert them into the associated historical modified employee spreadsheets. In some embodiments, the machine-learned model also includes a language model configured to generate a set of executable scripts based on the identified data modification operations. In some embodiments, the language model may be a large language model (LLM), and the central database system is configured to generate a prompt and input the prompt to the LLM, causing the LLM to generate a set of executable scripts.

The central database system applies 850 the machine-learned model to a target employee spreadsheet to generate a target set of executable scripts. In some embodiments, applying 850, the machine-learned model to the target employee spreadsheet includes generating a prompt and inputting the prompt to the machine-learned model, causing the machine-learned model to generate the target set of executable scripts. In some embodiments, the machine-learned model is an LLM that is capable of context learning. In some embodiments, the prompt includes a few examples that can be learned by the LLM. In some embodiments, the prompt includes at least a portion of a most similar historical employee spreadsheet and a corresponding portion of the associated historical modified employee spreadsheet. In some embodiments, the prompt includes an entire most similar historical employee spreadsheet and an entire associated historical modified employee spreadsheet.

In some embodiments, the prompt also includes a request for the LLM to generate a set of executable scripts to take the most similar historical employee spreadsheet and turn it into the corresponding associated historical modified employee spreadsheet. In some embodiments, the prompt also includes a scripting language that the target set of executable scripts should be written in.

Once the target set of executable scripts are received, the central database system applies 860 the target set of executable scripts to the target employee spreadsheet to produce a target modified spreadsheet. In some embodiments, the central database system presents at least a portion of the target modified employee spreadsheet in a user interface and allows a user to provide feedback. For example, in some embodiments, the user may be able to accept or reject the target modified employee spreadsheet. Alternatively, or in addition, the user may be able to accept a subset of the data operations performed on the target employee spreadsheet and reject a remaining subset of the data operations performed on the target employee spreadsheet.

Alternatively, or in addition, the user may be able to indicate an additional data operation to be performed on the target modified employee spreadsheet, causing the central database system to perform the additional data operation.

In some embodiments, the central database system may be configured to generate an updated prompt for the LLM based on the user feedback, and cause the LLM to consider the feedback and/or requirements and generate a new set of executable scripts.

The central database system transmits 870 the target modified spreadsheet to an employee spreadsheet processing system for further processing. In some embodiments, the employee spreadsheet processing system is configured to analyze the received target modified spreadsheet to determine whether the received target modified spreadsheet satisfies a predetermined set of conditions or requirements. For example, one requirement may be whether the received spreadsheet includes each of the required columns. Another requirement may be whether data in a particular column is in a particular format, such as date, time, or dollar amount. Another requirement may be whether there are extra columns that should not be included.

In some embodiments, the central database system may be configured to generate an updated prompt for the LLM based on the requirements of the employee spreadsheet processing system, and cause the LLM to consider the requirements and generate a new set of executable scripts.

This process may repeat as many times as necessary until the generated target modified employee spreadsheet is satisfactory to the user and/or the employee spreadsheet processing system.

In some embodiments, the target employee spreadsheet and the target modified employee spreadsheet are included as additional training data in the training set 310 for retraining or fine-tuning the machine-learned model 300. In some embodiments, the target set of executable scripts may also be included in the training set 310 for retraining or fine-tuning the machine-learned model 300. In some embodiments, the target employee spreadsheet and the target modified employee spreadsheet may also be included in a prompt for an LLM 400 to generate scripts for a new target employee spreadsheet.

Example Computing System

Figure 9:
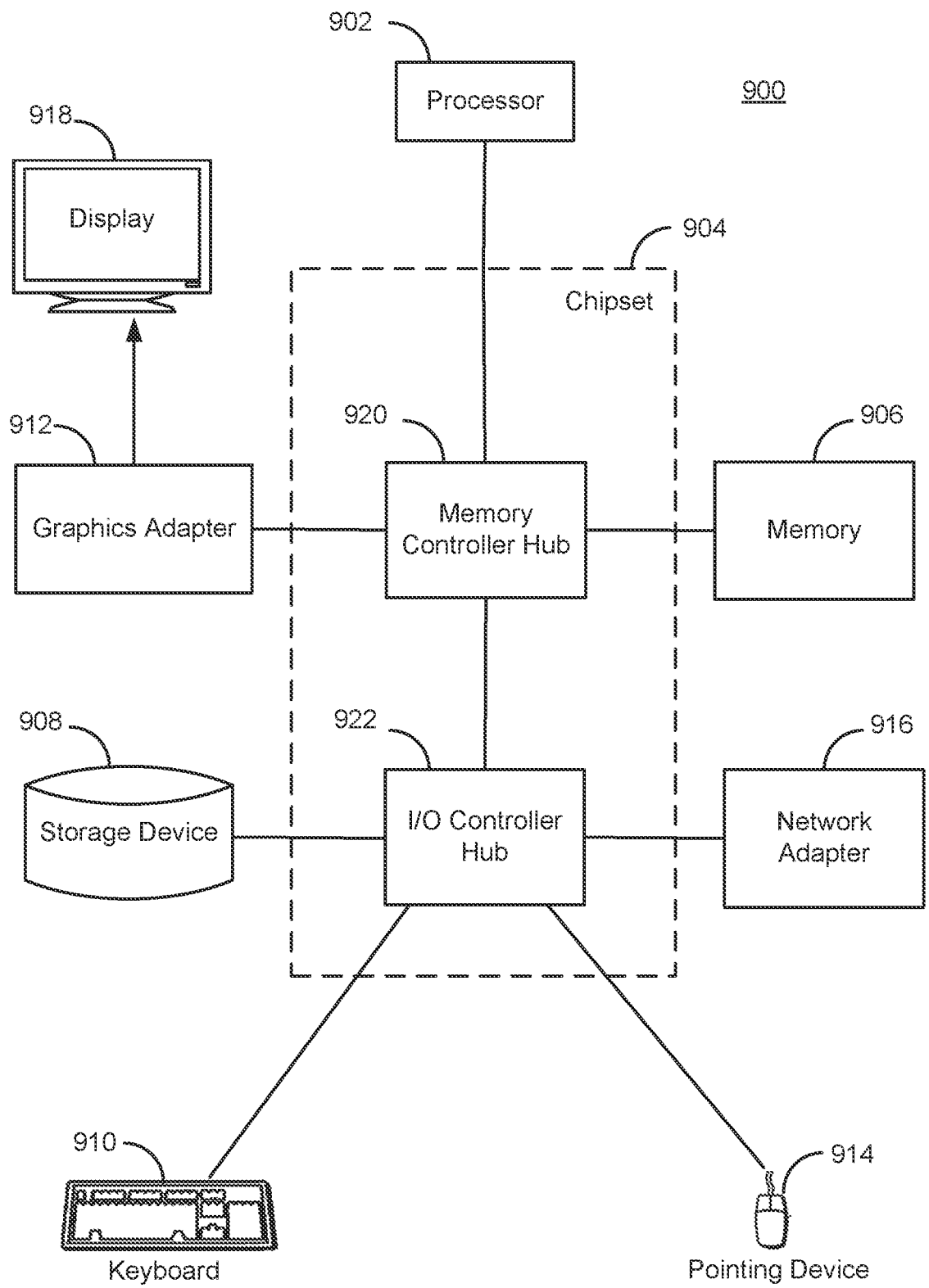
FIG. 9 is a block diagram of an example computer suitable for use in the networked computing environment of FIG. 1 in accordance with one or more embodiments.

FIG. 9 is a block diagram of an example computer 900 suitable for use in the networked computing environment 100 of FIG. 1. The computer 900 is a computer system and is configured to perform specific functions as described herein. For example, the specific functions corresponding to central database system 110, historical entity system 130, and/or target entity system 140 may be configured through the computer 900.

The example computer 900 includes a processor system having one or more processors 902 coupled to a chipset 904. The chipset 904 includes a memory controller hub 920 and an input/output (I/O) controller hub 922. A memory system having one or more memories 906 and a graphics adapter 912 are coupled to the memory controller hub 920, and a display 918 is coupled to the graphics adapter 912. A storage device 908, keyboard 910, pointing device 914, and network adapter 916 are coupled to the I/O controller hub 922. Other embodiments of the computer 900 have different architectures.

In the embodiment shown in FIG. 9, the storage device 908 is a non-transitory computer-readable storage medium such as a hard drive, compact disk read-only memory (CD-ROM), DVD, or a solid-state memory device. The memory 906 holds instructions and data used by the processor 902. The pointing device 914 is a mouse, track ball, touchscreen, or other types of a pointing device and may be used in combination with the keyboard 910 (which may be an on-screen keyboard) to input data into the computer 900. The graphics adapter 912 displays images and other information on the display 918. The network adapter 916 couples the computer 900 to one or more computer networks, such as network 150.

The types of computers used by the entities and central database system 110 of FIGS. 1 through 3 can vary depending upon the embodiment and the processing power required by the enterprise. For example, the central database system 110 might include multiple blade servers working together to provide the functionality described. Furthermore, the computers can lack some of the components described above, such as keyboards 910, graphics adapters 912, and displays 918.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
accessing a set of historical employee spreadsheets, each associated with employee activity and characteristics for a period of time;
identifying, for each historical employee spreadsheet, an associated historical modified spreadsheet generated in response to one or more data modification operations being applied to the historical employee spreadsheet;
generating a training set of data comprising the historical employee spreadsheets and the associated historical modified spreadsheets;
training a machine-learned model using the training set of data, the machine-learned model configured to:
receive an employee spreadsheet;
determining a similarity score between the received employee spreadsheet and each of the historical employee spreadsheets, each similarity score indicating a similarity between the received employee spreadsheet and a respective historical employee spreadsheet;
identify a set of historical employee spreadsheets that have highest similarity scores with respect to the received employee spreadsheet;
identify one or more data modification operations used to generate the historical modified spreadsheets associated with the identified set of historical employee spreadsheets; and
generate a set of executable scripts based on the identified one or more data modification operations, wherein when the set of executable scripts is executed on the received employee spreadsheet, the one or more data modification operations are applied to the received employee spreadsheet to cause the received employee spreadsheet to be modified;
receiving a target employee spreadsheet;
modifying the target employee spreadsheet by applying the machine-learned model to the target employee spreadsheet, the machine-learned model generating a target set of executable scripts, and applying the target set of executable scripts to the target employee spreadsheet to produce a target modified spreadsheet; and
transmitting the target modified spreadsheet to an employee spreadsheet processing system.

2. The method of claim 1, further comprising:
receiving feedback that the target modified spreadsheet does not satisfy one or more requirements of the employee spreadsheet processing system; and
causing the machine-learned model to generate a new set of executable scripts based on the feedback.

3. The method of claim 2, wherein the machine-learning model is retrained based on the feedback, and the retrained machine-learning model is caused to generate the new set of executable scripts.

4. The method of claim 1, wherein the one or more data modification operations comprise:
identifying related data entries; and
aggregating the identified related data entries into a single entry.

5. The method of claim 1, wherein the one or more data modification operations comprise:
identifying data entries associated with a plurality of types of expenses; and
adding the data entries associated with the plurality of types of expenses into a single entry associated with a single type of reimbursement.

6. The method of claim 1, wherein the one or more data modification operations comprise:
identifying time-tracking data entries associated with a plurality of task types and associated cost rates; and
aggregating a set of time-tracking data entries based in part on an identified task type or an associated cost rate.

7. The method of claim 1, wherein the one or more data modification operations comprise:
detecting a new data entry in the target employee spreadsheet; and
applying the set of executable scripts to the new data entry to produce a target data entry to generate a modified new data entry; and
transmitting the modified new data entry to the employee spreadsheet processing system.

8. The method of claim 1, wherein the machine-learning model is a large language model (LLM), the method further comprising generating a prompt, including:
a first set of one or more records from the target employee spreadsheet in a first format,
a second set of one or more modified records corresponding to the first set of one or more records in a second format, and
a request for generating a set of executable scripts for converting the first set of one or more records to the second set of one or more modified records.

9. The method of claim 8, the method further comprising:
receiving the set of executable scripts from the LLM; and
executing the set of executable scripts on remaining records of the target employee spreadsheet, causing the remaining record of the target employee spreadsheet to be converted to the second format.

10. The method of claim 8, wherein the request further specifies a language of the executable scripts.

11. The method of claim 10, wherein the specified language is Python.

12. A non-transitory computer-readable storage medium storing executable instructions that, when executed by one or more processors, cause the one or more processors to perform operations comprising:
accessing a set of historical employee spreadsheets, each associated with employee activity and characteristics for a period of time;
identifying, for each historical employee spreadsheet, an associated historical modified spreadsheet generated in response to one or more data modification operations being applied to the historical employee spreadsheet;
generating a training set of data comprising the historical employee spreadsheets and the associated historical modified spreadsheets;
training a machine-learned model using the training set of data, the machine-learned model configured to:
receive an employee spreadsheet;
determining a similarity score between the received employee spreadsheet and each of the historical employee spreadsheets, each similarity score indicating a similarity between the received employee spreadsheet and a respective historical employee spreadsheet;

identify a set of historical employee spreadsheets that have highest similarity scores with respect to the received employee spreadsheet;

identify one or more data modification operations used to generate the historical modified spreadsheets associated with the identified set of historical employee spreadsheets; and generate a set of executable scripts based on the identified one or more data modification operations, wherein when the set of executable scripts is executed on the received employee spreadsheet, the one or more data modification operations are applied to the received employee spreadsheet to cause the received employee spreadsheet to be modified;

receiving a target employee spreadsheet;

modifying the target employee spreadsheet by applying the machine-learned model to the target employee spreadsheet, the machine-learned model generating a target set of executable scripts, and applying the target set of executable scripts to the target employee spreadsheet to produce a target modified spreadsheet; and transmitting the target modified spreadsheet to an employee spreadsheet processing system.

13. The non-transitory computer-readable storage medium of claim 12, wherein the one or more data modification operations comprise:
   identifying related data entries; and
   aggregating the identified related data entries into a single entry.

14. The non-transitory computer-readable storage medium of claim 12, wherein the one or more data modification operations comprise:
   identifying data entries associated with a plurality of types of expenses; and
   adding the data entries associated with the plurality of types of expenses into a single entry associated with a single type of reimbursement.

15. The non-transitory computer-readable storage medium of claim 12, wherein the one or more data modification operations comprise:
   identifying time-tracking data entries associated with a plurality of task types and associated cost rates; and
   aggregating a set of time-tracking data entries based in part on an identified task type or an associated cost rate.

16. The non-transitory computer-readable storage medium of claim 12, wherein the one or more data modification operations comprise:
   detecting a new data entry in the target employee spreadsheet; and
   applying the set of executable scripts to the new data entry to produce a target data entry to generate a modified new data entry; and
   transmitting the modified new data entry to the employee spreadsheet processing system.

17. The non-transitory computer-readable storage medium of claim 12, wherein the machine-learning model is a large language model (LLM) configured to receive a prompt comprising:
   a first set of one or more records from the target employee spreadsheet in a first format,
   a second set of one or more modified records corresponding to the first set of one or more records in a second format, and
   a request for generating a set of executable scripts for converting the first set of one or more records to the second set of one or more modified records.

18. The non-transitory computer-readable storage medium of claim 17, the one or more processors further caused to perform operations comprising:
   receiving the set of executable scripts from the LLM; and
   executing the set of executable scripts on remaining records of the target employee spreadsheet, causing the remaining record of the target employee spreadsheet to be converted to the second format.

19. The non-transitory computer-readable storage medium of claim 18, wherein the request further specifies a language of the executable scripts.

20. A central database system comprising one or more hardware processors and a non-transitory computer-readable storage medium storing executable instructions that, when executed by the one or more hardware processors, cause the one or more hardware processors to perform operations comprising:
   accessing a set of historical employee spreadsheets, each associated with employee activity and characteristics for a period of time;
   identifying, for each historical employee spreadsheet, an associated historical modified spreadsheet generated in response to one or more data modification operations being applied to the historical employee spreadsheet;
   generating a training set of data comprising the historical employee spreadsheets and the associated historical modified spreadsheets;
   training a machine-learned model using the training set of data, the machine-learned model configured to:
     receive an employee spreadsheet;
     determining a similarity score between the received employee spreadsheet and each of the historical employee spreadsheets, each similarity score indicating a similarity between the received employee spreadsheet and a respective historical employee spreadsheet;
     identify a set of historical employee spreadsheets that have highest similarity scores with respect to the received employee spreadsheet;
     identify one or more data modification operations used to generate the historical modified spreadsheets associated with the identified set of historical employee spreadsheets; and
     generate a set of executable scripts based on the identified one or more data modification operations, wherein when the set of executable scripts is executed on the received employee spreadsheet, the one or more data modification operations are applied to the received employee spreadsheet to cause the received employee spreadsheet to be modified;
   receiving a target employee spreadsheet;
   modifying the target employee spreadsheet by applying the machine-learned model to the target employee spreadsheet, the machine-learned model generating a target set of executable scripts, and applying the target set of executable scripts to the target employee spreadsheet to produce a target modified spreadsheet; and
   transmitting the target modified spreadsheet to an employee spreadsheet processing system.

\* \* \* \* \*